(12) United States Patent
Nakai

(10) Patent No.: US 6,285,530 B1
(45) Date of Patent: Sep. 4, 2001

(54) GUIDED DRIVING DEVICE FOR A MOVING HEAD

(75) Inventor: Takashi Nakai, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/358,867

(22) Filed: Jul. 22, 1999

(30) Foreign Application Priority Data

Jul. 24, 1998 (JP) .................................................. 10-209193

(51) Int. Cl.$^7$ .................................................. G11B 21/02
(52) U.S. Cl. .................................. 360/266.6; 360/266.7; 369/249
(58) Field of Search .............................. 360/266.2, 266.4, 360/266.5, 266.8; 369/244, 249, 219

(56) References Cited

U.S. PATENT DOCUMENTS

| | | | |
|---|---|---|---|
| 4,630,145 | * | 12/1986 | Thompson et al. ............... 360/77.08 |
| 4,873,598 | * | 10/1989 | Negishi et al. ....................... 360/106 |
| 5,032,942 | * | 7/1991 | Kurosawa et al. .................... 360/109 |
| 5,105,419 | * | 4/1992 | Ogura et al. .......................... 369/219 |
| 5,136,446 | * | 8/1992 | Yamamoto et al. .................. 360/106 |
| 5,299,083 | | 3/1994 | Kawada ................................ 360/106 |
| 5,592,459 | * | 1/1997 | Kasahara .............................. 369/112 |
| 5,748,410 | * | 5/1998 | Briggs et al. ........................ 360/106 |
| 5,969,908 | * | 10/1999 | Angellotti ............................ 360/106 |

FOREIGN PATENT DOCUMENTS 63-269381 * 11/1988 (JP) .

* cited by examiner

Primary Examiner—Brian E. Miller
(74) Attorney, Agent, or Firm—Brinks Hofer Gilson & Lione

(57) ABSTRACT

A drive section is disposed on only one side of a moving member. In the drive section, a coil is disposed sideways of a support portion so as to be in a vertically long state, and a guide portion is provided on an upper surface of the coil so as to extend from the coil onto a U-shaped yoke disposed on the side opposed to the coil. One side of the yoke is inserted into the coil. On an upper surface of the yoke is disposed a guide receiving portion which supports the tip end of the guide portion slidably. The yoke can be utilized to prevent rotation of the moving member, whereby it is possible to attain the simplification of structure.

12 Claims, 4 Drawing Sheets

GUIDED DRIVING DEVICE FOR A MOVING HEAD

BACKGROUND OF THE INVENTION

1. Field of the Invention

The present invention relates to a head moving device for moving a head with respect to a disk. Particularly, the invention is concerned with a head moving device having a reduced size of a drive section for driving a head.

2. Description of the Related Art

FIG. 5 is a plan view showing a conventional head moving device 30 and FIG. 6 is a sectional view taken on line 6—6 in FIG. 5.

In the head moving device 30 shown in FIG. 5, a guide shaft 28 is fixed to a chassis (not shown), and a fitting hole (a bearing portion) 26d of a moving member 26 is fitted on the guide shaft 28. The guide shaft 28 is disposed in the radial direction of a disk D and is movable in the same direction.

On the moving member 26 are mounted a head body 27a on a 0 side opposed to the lower surface of the disk D and a head body 27b on a 1 side opposed to the upper surface of the disk, the head body 27b being fixed to the tip of an arm such as a plate spring extending from a support portion 26a of on the moving member 26 toward the disk D.

An extending portion 26b is integral with the moving member 26, the extending portion 26 projecting in an L shape sideways from the moving member, as shown in FIG. 6.

A drive section 31 is disposed sideways of the moving member 26. Although in FIGS. 5 and 6 the drive section 31 is disposed on only one side of the moving member 26, a drive section similar to the drive section 31 is sometimes disposed also on the opposite side of the moving member 26.

In the drive section 31, a coil 22 is fixed into a recess 26c with use of an adhesive or the like. The recess is formed by both support portion 26a and extending portion 26b. A generally turned square U-shaped guide portion 24 is provided at the distal end of the extending portion 26b, and a recess 24a of the guide portion 24 is supported by a sub-guide shaft 29 so as to be slidable with respect to the sub-guide shaft, the sub-guide shaft 29 being provided on the chassis side in parallel with the guide shaft 28.

A yoke 21b is inserted into a coil center hole 22a formed inside the coil 22. Also above the coil 22 is disposed a yoke 21a. Both yokes 21a and 21b are fixed at both ends thereof with screws. A plate-like magnet 23 having approximately the same shape as the yoke 21a is attached to the yoke 21a.

In the head moving device 30 constructed as above, when the coil 22 is energized, a drive force acting in the radial direction of the disk D is generated in the moving member 26. The moving member 26 is prevented from rotating about the guide shaft 28 by sliding contact of the sub-guide shaft 29 with the recess 24a of the guide portion 24. As the moving member 26 moves, the head bodies 27a and 27b slide in the radial direction of the disk D while holding the disk therebetween.

However, the following problems have been encountered in the above conventional head moving device 30.

In the head moving device 30, if driving sections 31 are disposed on both sides of the moving member 26, the whole of the device becomes larger in size, but if a driving section 31 is disposed on only one side of the moving member 26, the entire device can be somewhat reduced in size, as shown in FIGS. 5 and 6. However, for stabilizing the balance of the moving member 26, it is required to use such an expensive component as the sub-guide shaft 29 and thus it is impossible to attain a further reduction of cost.

Besides, as shown in FIG. 6, the plate-like shape of the yokes 21a and 21b is wider in the same planar direction as the disk D, and the coil 22 is also wide planarly. Consequently, as shown in FIG. 5, the distance L2 between a work line of a driving force F generated in the coil 22 (a center line S1 in the width direction of the coil) and a center line S2 of the guide shaft 28 becomes very long, so that a planar moment M acting on the center of the moving member 26 during operation becomes very large. As a result, a sliding friction force between the fitting hole (bearing portion) 26d of the moving member 26 and the guide shaft 28 becomes large and the motion of the moving member 26 becomes stiff, or the guide shaft 28 and the fitting hole (bearing portion) 26c is apt to wear.

SUMMARY OF THE INVENTION

The present invention has been accomplished for solving the above-mentioned problems and it is an object of the invention to provide a head moving device capable of keeping the balance of a moving member stable even without using an expensive component such as a sub-guide shaft, also capable of attaining the reduction in size and weight of the mechanism and further capable of diminishing the moment acting on the moving member.

DETAILED DESCRIPTION OF PREFERRED EMBODIMENTS

Figure 1:
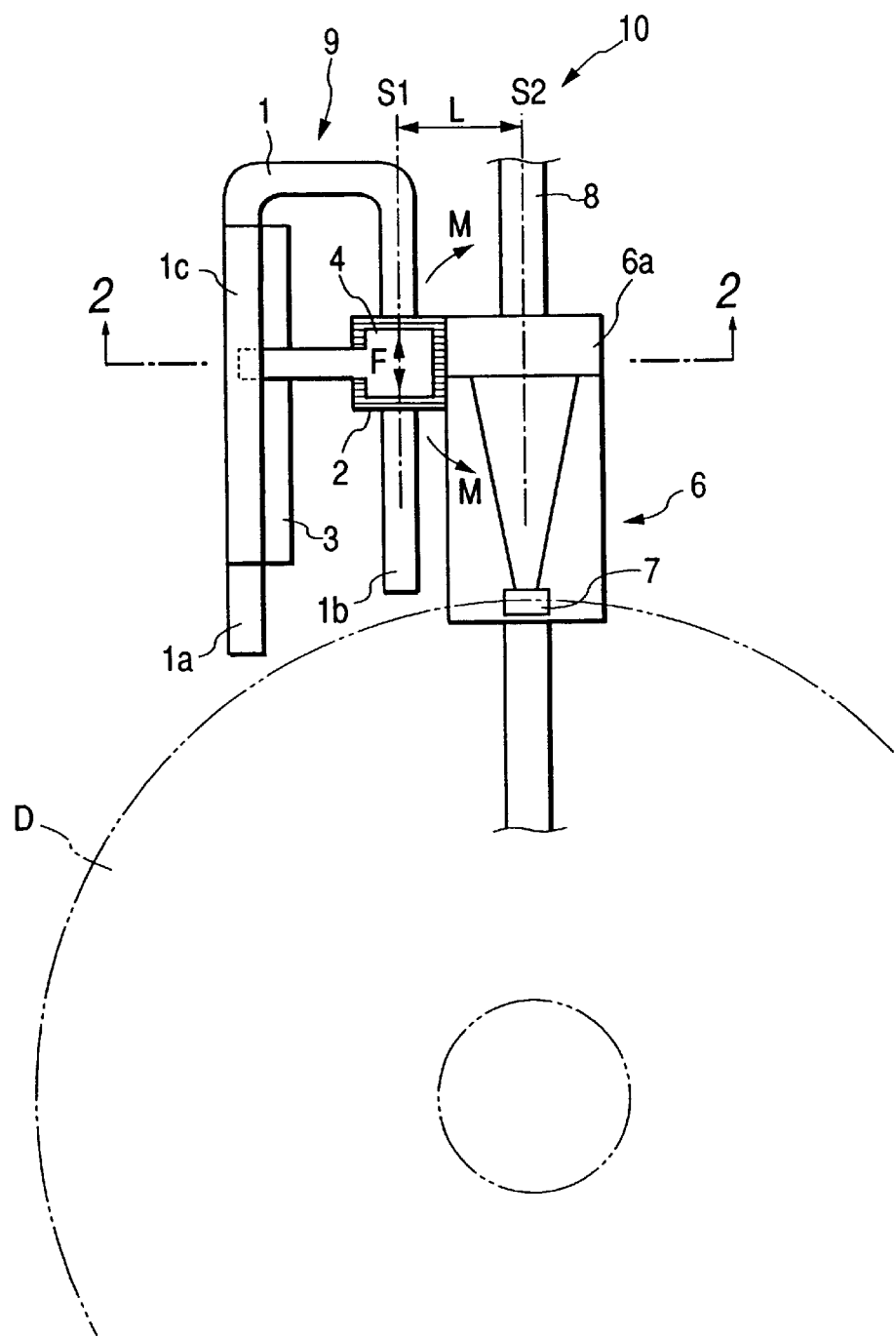
FIG. 1 is a plan view showing a head moving device according to an embodiment of the present invention.
Figure 2:
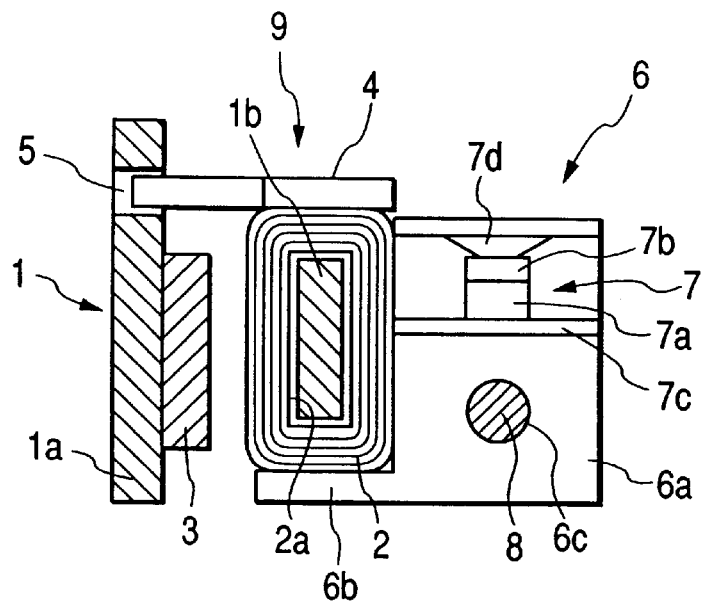
FIG. 2 is a sectional view taken on line 2—2 in FIG. 1.
Figure 3:
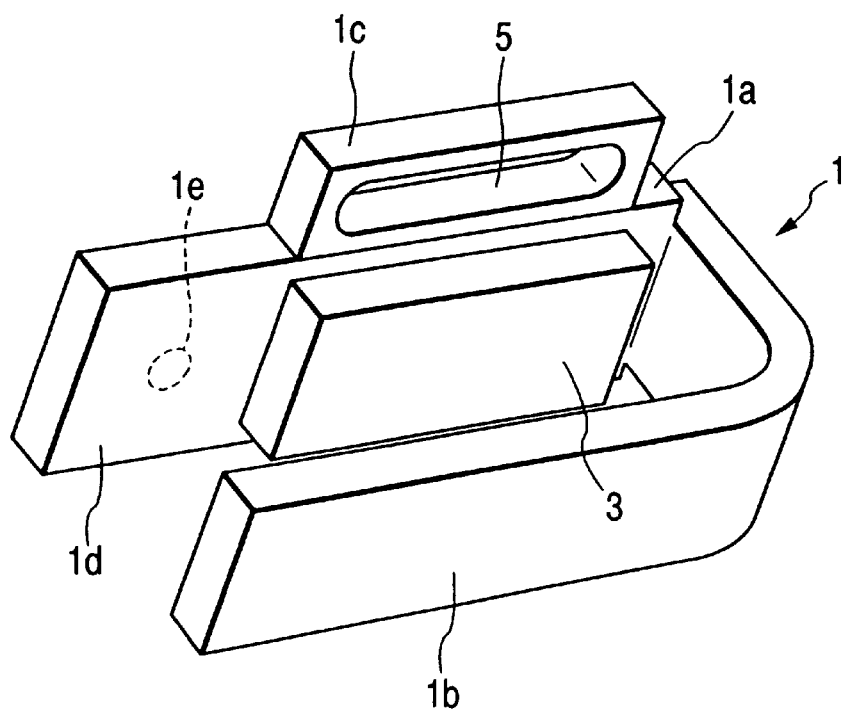
FIG. 3 is a perspective view showing a yoke with a magnet attached thereto.
Figure 4:
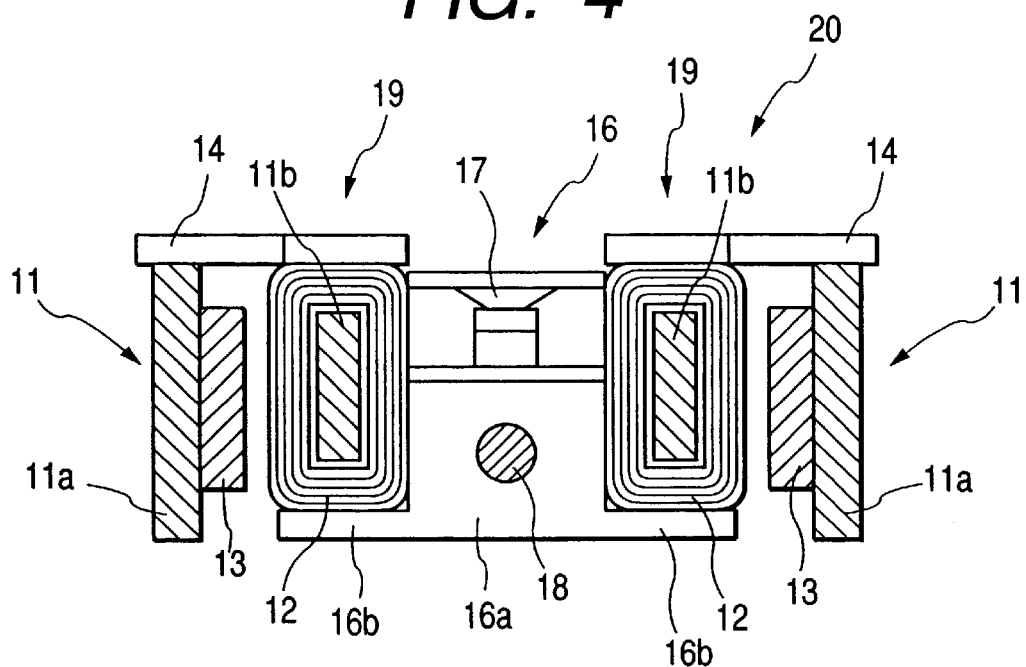
FIG. 4 is a sectional view showing a head moving device according to another embodiment of the present invention.

Head moving devices embodying the present invention will be described hereinunder with reference to the accompanying drawings, in which FIG. 1 is a plan view showing a head moving device according to an embodiment of the present invention, FIG. 2 is a sectional view taken on line 2—2 in FIG. 1, FIG. 3 is a perspective view showing a yoke with a magnet attached thereto, and FIG. 4 is a sectional view showing a head moving device according to another embodiment of the present invention.

The head moving device 10 shown in FIG. 1 and indicated at 10 comprises a moving member 6, a guide shaft 8 and a drive section 9.

As shown in FIG. 2, a fitting hole (bearing portion) 6c is formed in the moving member 6 and it is fitted on the guide shaft 8 slidably. The guide shaft 8 is disposed in the radial direction of a disk D and is fixed to a chassis (not shown).

The moving member 6 has a support portion 6a, and a head body 7 is provided on the disk D side of the support portion 6a. In the head body 7, a lower (0 side) head 7a for reading and writing data on a lower surface of the disk D is supported on an upper surface of gimbals 7c which is located on the moving member 6, while an upper (1 side) head 7b for reading and writing data on an upper surface of the disk D is fixed to a lower surface of a resilient plate spring 7d at a position opposed to the head 7a, the plate spring 7d projecting from the support portion 6a. Further provided is a retracting mechanism (not shown) for retracting the head 7b upward.

In the drive section 9, a coil 2 is disposed sideways of the moving member 6. As shown in FIG. 2, the coil 2 is centrally formed with a rectangular insertion hole (a coil center hole) 2a, and an upper surface of an extending portion 6b extending in a lateral direction from the bottom of the support portion 6a, a side face of the support portion 6a, and the coil 2, are fixed together using an adhesive or the like.

As shown in FIG. 2, the coil 2 is disposed so that in the section in its winding direction, its longitudinal direction corresponds to a vertical direction.

A U-shaped yoke 1 is disposed sideways of the moving member 6. One yoke portion 1b is inserted from behind into the insertion hole 2a of the coil 2 and is fixed to the chassis side (not shown). A plate-like magnet 3 is attached to the inner surface side of a yoke portion 1a located on the side opposed to the coil 2. The yoke portions 1a, 1b and the magnet 3 are disposed in such a manner that their width direction correspond to the vertical direction.

On an upper surface of the yoke portion 1a on the side where the magnet 3 is attached to the yoke portion, a guide receiving portion 1c having a guide hole 5 is formed integrally with the yoke portion 1a, the guide hole 5 being formed in the moving direction of the moving member 6. Instead of the guide hole 5, which is a through hole, a guide slot (recess) may be formed in the guide receiving portion 1c in such a manner that the guide portion 4 can be held therein slidably.

The guide portion 4 is formed, for example, by a resin plate of a relatively high rigidity and a base end portion thereof is fixed to an upper surface of the coil 2 with use of an adhesive or the like, while the opposite end portion thereof is supported slidably within the guide hole 5. The base end portion of the guide portion 4 may be fixed to the moving member 6.

As shown in FIG. 3, the yoke portion 1a extends longer than the yoke portion 1b in the operating direction of the drive section 9 to constitute an extending portion 1d integrally, with a tapped hole 1e being formed in the extending portion 1d. This tapped hole 1e portion and a portion raised from the chassis and formed with a mounting hole are fixed together with a screw.

In the head moving device 10 constructed as above, a flexible substrate (not shown) is connected to the coil 2 and the coil is energized, whereby the coil moves while being guided by the yoke portion 1b and at the same time the guide portion 4 moves while sliding within the guide hole 5 of the guide receiving portion 1c.

Figure 6:
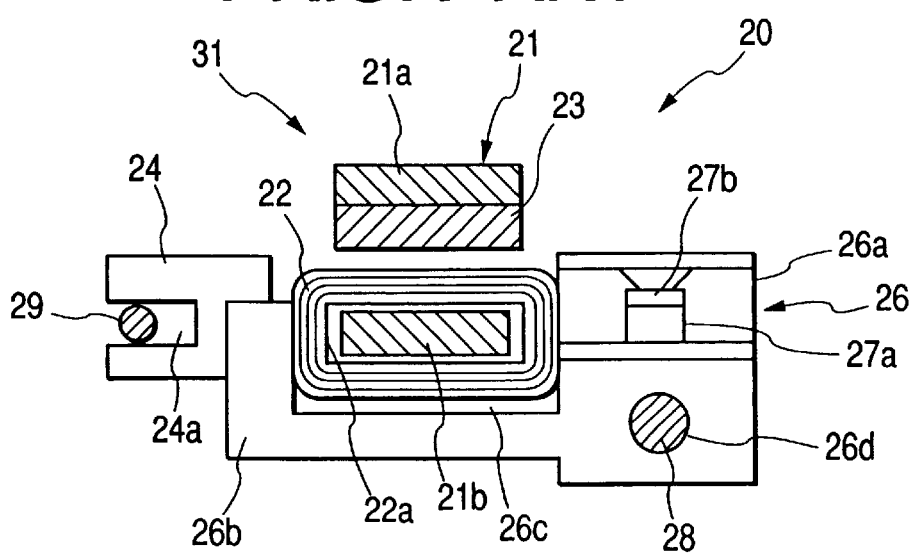
FIG. 6 is a sectional view taken on line 6—6 in FIG. 5.
Figure 5:
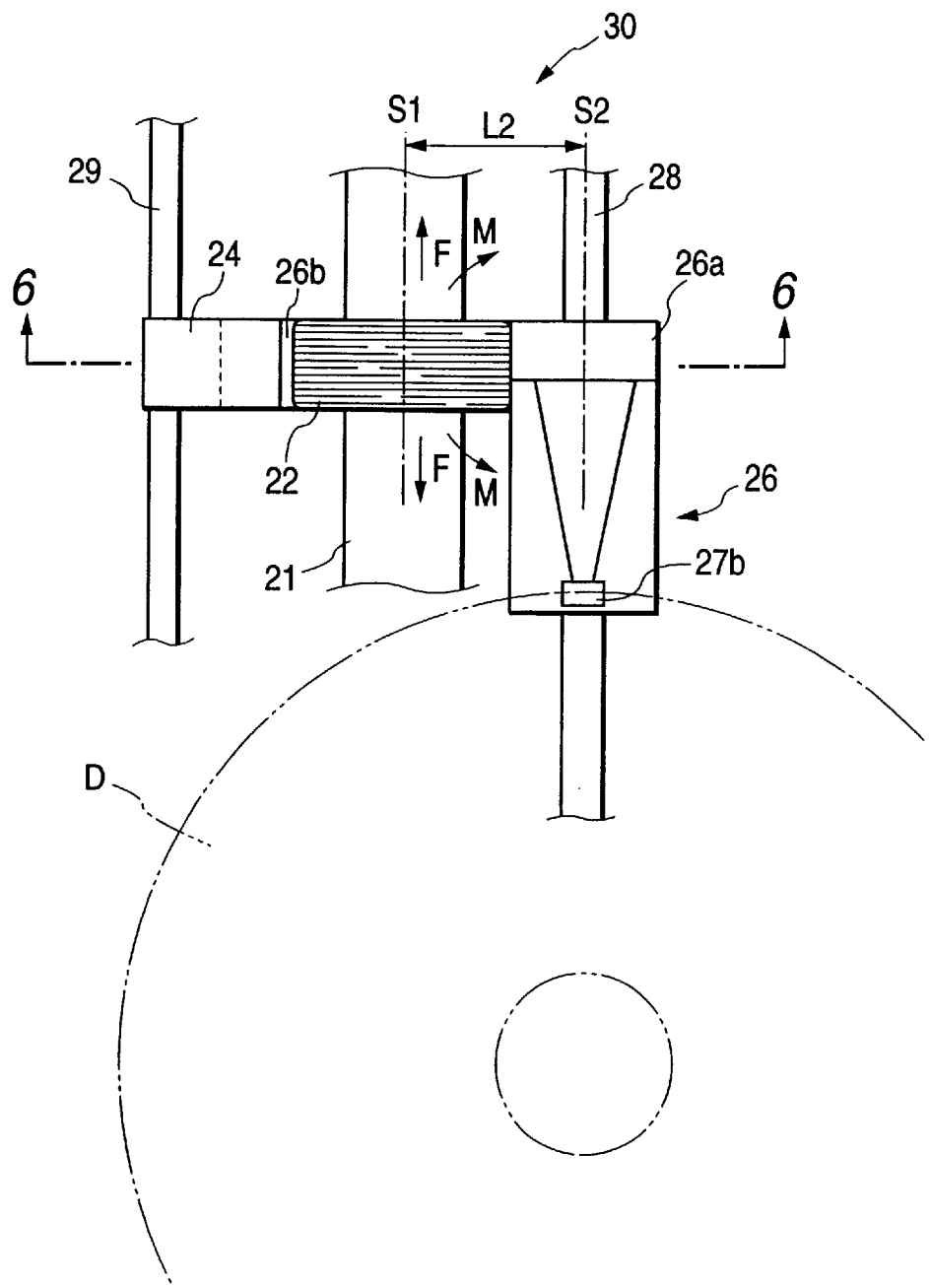
FIG. 5 is a plan view showing a conventional head moving device.

Since the guide portion 4 slides within the guide hole 5 located on the yoke portion 1a, the moving member 6 is prevented from rotating about the guide shaft 8 even without using such a sub-guide shaft 29 as shown in FIGS. 5 and 6, whereby it is possible to reduce the number of components used and also reduce the size of the device.

Further, since the coil 2 is disposed in a vertical fashion, the distance L between a center line S1 of the coil 2 (a work line of a driving force F) and a center line S2 of the guide shaft 8 becomes shorter than in a horizontal installation of the coil 2. Consequently, it is possible to diminish a moment M in a plane induced by the driving force F, also possible to diminish a sliding friction between the fitting hole (bearing portion) 6c and the guide shaft 8, further possible to move the moving member smoothly, and still further possible to diminish the wear of the guide shaft 8 and of the fitting hole (bearing portion) 6c.

FIG. 4 is a sectional view showing a head moving device 20 according to another embodiment of the present invention.

In the head moving device 20, drive sections 19 are disposed respectively on both sides of a moving member 16.

The moving member 16 is fitted on a guide shaft 18 and is thereby supported so as to be movable in the radial direction of the disk D. As in the previous embodiment shown in FIG. 1, a head body 17 is supported by the moving member 16.

Extending portions 16b are formed integrally with the bottom of a support portion 16a so as to extend respectively from both sides of the bottom. Coils 12, which are disposed in a vertical fashion as in the previous embodiment, are fixed respectively onto upper surfaces of the extending portions 16b with use of an adhesive or the like.

Guide portions 14 are affixed respectively to upper surfaces of the coils 12 using an adhesive or the like. The guide portions 14 are in the shape of such a plate as shown in FIG. 1 and it suffices for the guide portions to have a length sufficient to extend onto both the coils 12 and yokes 11 which will be described later.

The yokes 11 are each formed integrally in U shape. Each yoke portion 11b thereof is inserted respectively into the coils 12, and magnets 13 are attached respectively to the other yoke portions 11a on the side opposed to the coils 12. The yokes 11 and the magnet 12 are also positioned in a vertical fashion.

In the head moving device 20, the guide shaft 18 is fixed to a chassis (not shown), and extending portions of the yokes 11, which portions are formed in the same way as in FIG. 3, are fixed with screws or the like to portions which have been cut and raised from the chassis.

The guide portions 14 disposed on the coils 12 are supported slidably by upper surfaces of the yoke portions 11a, whereby the moving member 16 is prevented from rotation. In this embodiment, the rotation of the moving member 16 can be prevented by merely allowing the guide portions 14 to slide on the upper surfaces (or lower surfaces) of the yoke portions 11a. Thus, the entire structure can be made extremely simple.

Consequently, even when drive sections 19 are disposed respectively on both sides of the moving member 16, each drive section can be formed in a narrow width, so that it is possible to constitute the device smaller in both size and weight than the conventional device. Guide holes or slots, such as that shown in FIG. 3, may be formed respectively in the yokes 11a disposed on both sides of the moving member 16 and the guide portions may be allowed to slide therein.

The present invention is not limited to the head moving devices of the above embodiments. For example, the portion of the yoke which supports the guide portion may be disposed on the magnet-free side, not the magnet-mounted side, or the guide portion may be disposed on the lower surface side of the coil and be supported slidably on the lower surface of the yoke.

What is claimed is:

1. A driving device equipped with a head moving device comprising:

a head;

a moving member which supports said head;

a guide shaft for guiding said moving member in the radial direction of a disk disposed at a predetermined position; and a drive section for driving said moving member, wherein said drive section includes a coil fixed to said moving member and disposed in a vertical fashion so as to have a height larger than a horizontal width;

a U-shaped yoke made of a magnetic material which is adjacent to said coil and which has a pair of longitudinal portions extending in the moving direction of said moving member, one of said pair of longitudinal portions of said yoke being inserted into a coil center hole of said coil so as to be movable in relation to said coil, and the other longitudinal portion of said yoke being mounted to a chassis provided in said head driving device;

a magnet which is attached to the inner surface of the other longitudinal portion of said yoke opposing said one longitudinal portion of said yoke, and which extends in the moving direction of said moving member; and a bar-shaped guide portion having a base end portion fixed to said coil, and a free tip end portion extending to the other longitudinal portion of said yoke, and wherein a guide hole extending in the moving direction of said moving member is formed in the other longitudinal portion of said yoke, and said free tip end of said guide portion is guided by said guide hole so that said guide portion moves in accordance with the moving direction of said moving member together with said coil.

2. A head driving device according to claim 1, wherein said other longitudinal portion of said yoke is extended toward said disk as compared to said one longitudinal portion of said yoke, and this extended portion is fixed to the chassis.

3. A head driving device equipped with a head moving device comprising:

a head;

a moving member which supports said head;

a guide shaft for guiding said moving member in the radial direction of a disk disposed at a predetermined position; and a drive section for driving said moving member, wherein said drive section includes a coil fixed to said moving member and disposed in a vertical fashion so as to have a height larger than a horizontal width;

a U-shaped yoke made of a magnetic material which is adjacent to said coil and which has a pair of longitudinal portions extending in the moving direction of said moving member, one of said pair of longitudinal portions of said yoke being inserted into a coil center hole of said coil so as to be movable in relation to said coil, and the other longitudinal portion of said yoke being mounted to a chassis provided in said head driving device;

a magnet which is attached to the inner surface of the other longitudinal portion of said yoke opposing said one longitudinal portion of said yoke, and which extends in the moving direction of said moving member; and a bar-shaped guide portion having a base end portion fixed to said coil, and a free tip end portion extending to the other longitudinal portion of said yoke; and wherein a guide slot extending in the moving direction of said moving member is formed on said inner surface of the other longitudinal portion of said yoke, and said free tip end of said guide portion is guided by said guide slot so that said guide portion moves in accordance with the moving direction of said moving member together with said coil.

4. A head driving device according to claim 3, wherein said other longitudinal portion of said yoke is extended toward said disk as compared to said one longitudinal portion of said yoke, and this extended portion is fixed to the chassis.

5. A head driving device equipped with a head moving device comprising:

a head;

a moving member which supports said head;

a guide shaft for guiding said moving member in the radial direction of a disk disposed at a predetermined position; and a drive section for driving said moving member, wherein said drive section includes a coil fixed to said moving member and disposed in a vertical fashion so as to have a height larger than a horizontal width;

a U-shaped yoke made of a magnetic material which is adjacent to said coil and which has a pair of longitudinal portions extending in the moving direction of said moving member, one of said pair of longitudinal portions of said yoke being inserted into a coil center hole of said coil so as to be movable in relation to said coil, and the other longitudinal portion of said yoke being mounted to a chassis provided in said head driving device;

a magnet which is attached to the inner surface of the other longitudinal portion of said yoke opposing said one longitudinal portion of said yoke, and which extends in the moving direction of said moving member; and a bar-shaped guide portion formed in said moving member to extend from said moving member toward the longitudinal portion of said yoke, and a free tip end portion extending to the other longitudinal portion of said yoke; and wherein a guide hole extending in the moving direction of said moving member is formed in the other longitudinal portion of said yoke, and said free tip end of said guide portion is guided by said guide hole so that said guide portion moves in accordance with the moving direction of said moving member together with said coil.

6. A head driving device according to claim 5, wherein said other longitudinal portion of said yoke is extended toward said disk as compared to said one longitudinal portion of said yoke, and this extended portion is fixed to the chassis.

7. A head driving device equipped with a head moving device comprising:

a head;

a moving member which supports said head;

a guide shaft for guiding said moving member in the radial direction of a disk disposed at a predetermined position; and a drive section for driving said moving member, wherein said drive section includes a coil fixed to said moving member and disposed in a vertical fashion so as to have a height larger than a horizontal width;

a U-shaped yoke made of a magnetic material which is adjacent to said coil and which has a pair of longitudinal portions extending in the moving direction of said moving member, one of said pair of longitudinal portions of said yoke being inserted into a coil center hole of said coil so as to be movable in relation to said coil, and the other longitudinal portion of said yoke being mounted to a chassis provided in said head driving device;

a magnet which is attached to the inner surface of the other longitudinal portion of said yoke opposing said one longitudinal portion of said yoke, and which extends in the moving direction of said moving member; and a bar-shaped guide portion formed in said moving member to extend from said moving member toward the other longitudinal portion of said yoke, and a free tip end portion extending to the other longitudinal portion of said yoke; and wherein a guide slot extending in the moving direction of said moving member is formed on said inner surface of the other longitudinal portion of said yoke, and said free tip end of said guide portion is guided by said guide slot so that said guide portion moves in accordance with the moving direction of said moving member together with said coil.

8. A head driving device according to claim 7, wherein said other longitudinal portion of said yoke is extended toward said disk as compared to said one longitudinal portion of said yoke, and this extended portion is fixed to the chassis.

9. A head driving device equipped with a head moving device comprising:

a head;

a moving member which supports said head;

a guide shaft for guiding said moving member in the radial direction of a disk disposed at a predetermined position; and a drive section for driving said moving member, wherein said drive section includes a pair of coils fixed to said moving member on both sides of the moving direction of the moving member, and disposed in a vertical fashion so as to have a height larger than a horizontal width;

a pair of U-shaped yokes made of a magnetic material which are adjacent to said pair of coils and which have a pair of longitudinal portions extending in the moving direction of said moving member, one of said pair of longitudinal portions of each of said yokes being inserted into a coil center hole of each of said coils adjacent to each of said yokes so as to be movable in relation to each of said coils, and the other longitudinal portion of each of said yokes being mounted to a chassis provided in said head driving device;

a magnet extending in the moving direction of said moving member which is attached to the inner surface of the other longitudinal portion of each of said yokes opposing said one longitudinal portion of each of said yokes; and a pair of bar-shaped guide portions each having a base end portion fixed to each of said pair of coils, and a free tip end portion extending to the other longitudinal portion of each of said pair of yokes; and wherein said free tip end portion of a corresponding said guide portion of said pair of guide portions is slidably placed on the upper surface of the other longitudinal portion of each of said yokes, and guided by said upper surface of said longitudinal portion of each of said yokes so that each of said guide portions moves in accordance with the moving direction of said moving member together with each of said coils.

10. A head driving device according to claim 9, wherein said other longitudinal portion of said yoke is extended toward said disk as compared to said one longitudinal portion of said yoke, and this extended portion is fixed to the chassis.

11. A head driving device equipped with a head moving device comprising:

a head;

a moving member which supports said head;

a guide shaft for guiding said moving member in the radial direction of a disk disposed at a predetermined position; and a drive section for driving said moving member, wherein said drive section includes a pair of coils fixed to said moving member on both sides of the moving direction of the moving member, and disposed in a vertical fashion so as to have a height larger than a horizontal width;

a pair of U-shaped yokes made of a magnetic material which are adjacent to said pair of coils and which have a pair of longitudinal portions extending in the moving direction of said moving member, one of said pair of longitudinal portions of each of said yokes being inserted into a coil center hole of each of said coils adjacent to each of said yokes so as to be movable in relation to each of said coils, and the other longitudinal portion of each of said yokes being mounted to a chassis provided in said head driving device;

a magnet extending in the moving direction of said moving member which is attached to the inner surface of the other longitudinal portion of each of said yokes opposing said one longitudinal portion of each of said yokes; and a pair of bar-shaped guide portions each formed in said moving member to extend from said moving member toward each of the other longitudinal portion of each of said yokes, and each of a free tip end portions extending to the corresponding other longitudinal portion of each of said yokes; and wherein said free tip end portion of a corresponding guide portion of said pair of guide portions is slidably placed on the upper surface of the other longitudinal portion of each of said yokes, and guided by said upper surface of said longitudinal portion of each of said yokes so that each of said guide portions moves in accordance with the moving direction of said moving member together with each of said coils.

12. A head driving device according to claim 11, wherein said other longitudinal portion of said yoke is extended toward said disk as compared to said one longitudinal portion of said yoke, and this extended portion is fixed to the chassis.

* * * * *